US012664393B2

(12) United States Patent
Pohl et al.

(10) Patent No.: US 12,664,393 B2
(45) Date of Patent: Jun. 23, 2026

(54) METHOD FOR PRODUCING A SMART CARD INLAY, SMART CARD INLAY AND SMART CARD

(71) Applicant: Infineon Technologies AG, Neubiberg (DE)

(72) Inventors: Jens Pohl, Bernhardswald (DE); Frank Püschner, Kelheim (DE); Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/777,070

(22) Filed: Jul. 18, 2024

(65) Prior Publication Data

US 2025/0045555 A1      Feb. 6, 2025

(30) Foreign Application Priority Data

Aug. 1, 2023     (DE) .......................... 102023120408.4

(51) Int. Cl.
G06K 19/077          (2006.01)

(52) U.S. Cl.
CPC .............................. G06K 19/07722 (2013.01)

(58) Field of Classification Search
CPC ................................................ G06K 19/07722
USPC ........................................................ 235/492
See application file for complete search history.

(56) References Cited

U.S. PATENT DOCUMENTS

| | | | | | |
|---|---|---|---|---|---|
| 3,861,772 | A | * | 1/1975 | Shaffer | ................ H01R 4/2491 |
| | | | | | 439/393 |
| 2004/0206799 | A1 | * | 10/2004 | Wong | ................. H01R 43/0263 |
| | | | | | 228/180.5 |

| | | | | | |
|---|---|---|---|---|---|
| 2011/0189824 | A1 | * | 8/2011 | Zenz | ................. H01L 23/49822 |
| | | | | | 438/119 |
| 2012/0193801 | A1 | * | 8/2012 | Gross | ............... G06K 19/07754 |
| | | | | | 257/772 |
| 2012/0256813 | A1 | * | 10/2012 | Kostka | ................. H10K 50/805 |
| | | | | | 345/82 |
| 2015/0097040 | A1 | * | 4/2015 | Rampetzreiter | ............................ |
| | | | | | G06K 19/07794 |
| | | | | | 235/492 |
| 2018/0032854 | A1 | * | 2/2018 | Pueschner | .......... G06K 19/0775 |
| 2018/0331050 | A1 | * | 11/2018 | Chung | .................... H01L 23/06 |
| 2020/0050914 | A1 | * | 2/2020 | Finn | ................. G06K 19/07743 |
| 2020/0189244 | A1 | * | 6/2020 | Brennan | ................. B32B 27/20 |
| 2020/0384562 | A1 | * | 12/2020 | Goodell | ............... B23K 1/0016 |
| 2021/0154898 | A1 | * | 5/2021 | Lowe | .................... H05K 3/285 |

(Continued)

FOREIGN PATENT DOCUMENTS

| | | |
|---|---|---|
| DE | 295499 C | 12/1916 |
| DE | 10234751 A1 | 2/2004 |
| DE | 102012004485 A1 | 9/2013 |

OTHER PUBLICATIONS

Apr. 29, 2024 (DE) Office Action—App. 102023120408.4.

*Primary Examiner* — Allyson N Trail

(74) *Attorney, Agent, or Firm* — Banner & Witcoff, Ltd.

(57) ABSTRACT

A method for producing a smart card inlay, including: introducing an antenna wire into a surface of a carrier, wherein the antenna wire comprises metal having an insulating coating; pinching the antenna wire such that a partial region of the metal of the antenna wire is stripped of insulation; and soldering the insulation-stripped partial region of the metal of the antenna wire with a metallic contact region of a smart card module that has been introduced into an opening of the carrier.

20 Claims, 10 Drawing Sheets

(56) References Cited

U.S. PATENT DOCUMENTS

| | | | |
|---|---|---|---|
| 2021/0271950 A1* | 9/2021 | Nam | G06K 19/07749 |
| 2023/0359853 A1* | 11/2023 | Skårbratt | G06K 19/07722 |
| 2024/0070433 A1* | 2/2024 | Alexandre | G06K 19/07779 |
| 2024/0265228 A1* | 8/2024 | Mosteller | G06K 19/07705 |
| 2025/0112162 A1* | 4/2025 | Kang | H01L 21/56 |

* cited by examiner

R ( 5 : 1 )
(FRONT SIDE, ONLY DOWNSET)

P ( 5 : 1 )
(FRONT SIDE, INCL. IC MODULE)

T ( 5 : 1 )
(VIEW OF REAR SIDE)

100

104

U

U ( 5 : 1 )

V–V ( 20 : 1 )

442     440R

112

106T

110

112

106

K ( 4:1 )

L ( 4:1 )

1.) EMBOSSING FROM THE WIRE LAYING SIDE

106T

104

W-W ( 50 : 1 )

2.) SYMMETRICAL EMBOSSING
(DIE AND PLATE ARE OF THE SAME SIZE)

106T

104

Y-Y ( 50 : 1 )

3.) EMBOSSING FROM THE REAR SIDE

106T

104

AA-AA ( 50 : 1 )

4.) A PLURALITY OF EMBOSSING REGIONS

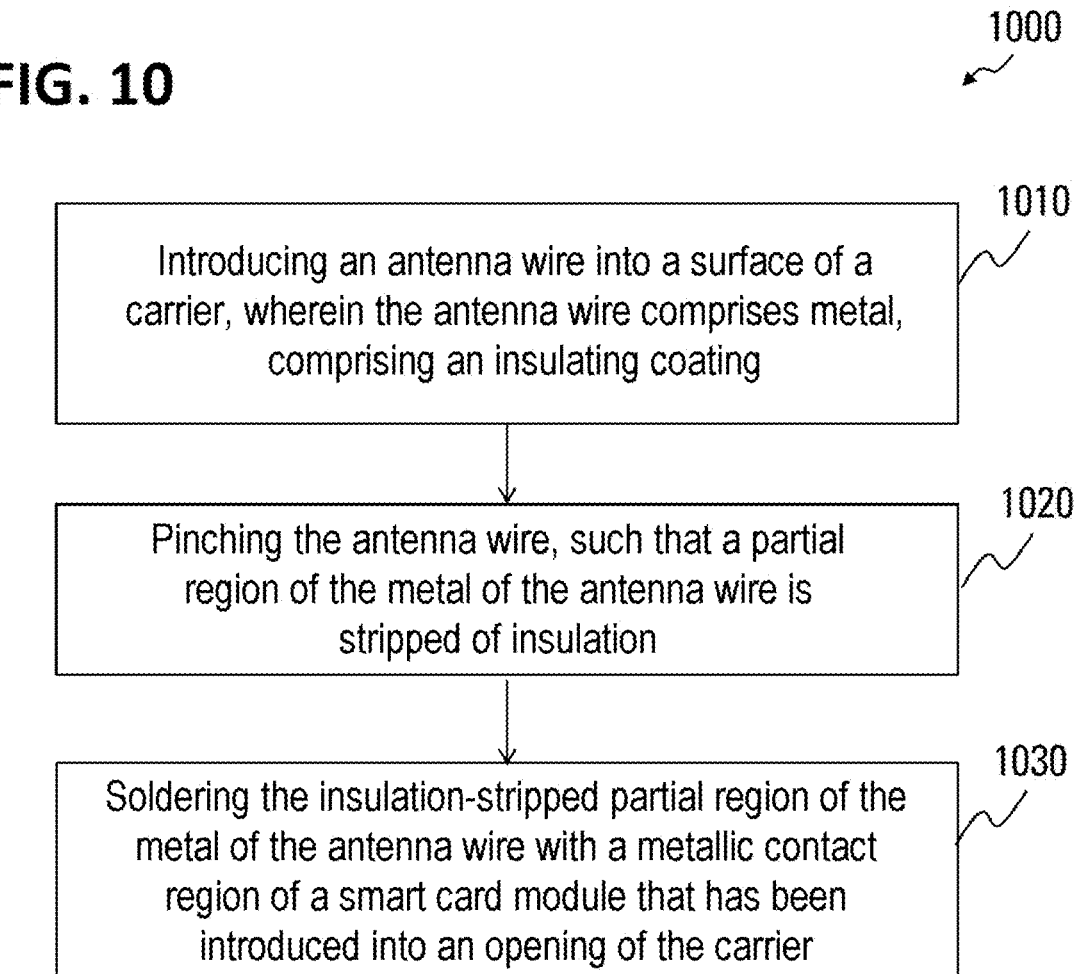

1010

Introducing an antenna wire into a surface of a carrier, wherein the antenna wire comprises metal, comprising an insulating coating

1020

Pinching the antenna wire, such that a partial region of the metal of the antenna wire is stripped of insulation

1030

Soldering the insulation-stripped partial region of the metal of the antenna wire with a metallic contact region of a smart card module that has been introduced into an opening of the carrier

METHOD FOR PRODUCING A SMART CARD INLAY, SMART CARD INLAY AND SMART CARD

TECHNICAL FIELD

The disclosure relates to a method for producing a smart card inlay, a smart card inlay and a smart card.

BACKGROUND

Thin smart card inlays are advantageous for production of thin documents with an electronic contactless (CL) function, for example identity cards in the ID1 format or passports with a thin data page.

Previous solutions widely available on the market typically use so-called secure elements (chips configured to provide security-relevant functions such as e.g. cryptographic functions) in molded modules, i.e. modules housed by means of a molten material, with a resistance-welded copper wire antenna.

Owing to their thickness, the molded modules may lead to stress cracks in a (e.g. polycarbonate) card body of the smart card and require expensive countermeasures, e.g. a use of so-called "crack prevention" films configured to prevent or alleviate stress cracks.

Moreover, the thickness of the secure element module also establishes a minimum total thickness of the smart card inlay, which typically amounts to more than 200 μm.

Other solutions use thin flip-chip secure elements on a printed (e.g. silver) antenna. Such solutions are technically more demanding and not in widespread use.

In various exemplary aspects, a very thin ("ultrathin") smart card inlay having an antenna and a mounted secure element for smart card and ID applications and a method for producing it are provided.

The smart card inlay can have a thickness of a maximum of approximately 180 μm, for example approximately 175 μm.

In the case of the smart card inlay in accordance with various exemplary aspects, a very thin secure element module, which is configured for mounting using FCOS technology ("IC module") and is mounted in an opening (e.g. a through opening) of the inlay by a soldering method, and also a specific aspect of the antenna wires to be contacted can be used.

SUMMARY

The method for producing a smart card inlay in accordance with various exemplary aspects comprises applying an antenna wire to a carrier, wherein the antenna wire comprises metal, comprising an insulating coating. The method furthermore comprises pinching the antenna wire, such that a partial region of the metal of the antenna wire is stripped of insulation, and soldering the insulation-stripped partial region of the metal of the antenna wire with a metallic contact region of a smart card module that has been introduced into an opening of the carrier.

BRIEF DESCRIPTION OF THE DRAWINGS

Exemplary aspects of the disclosure are illustrated in the figures and are explained in more detail below.

In the figures:

FIG. 10 shows a flow diagram of a method for producing a smart card inlay in accordance with various exemplary aspects.

DETAILED DESCRIPTION

Figures 1A, 1B:
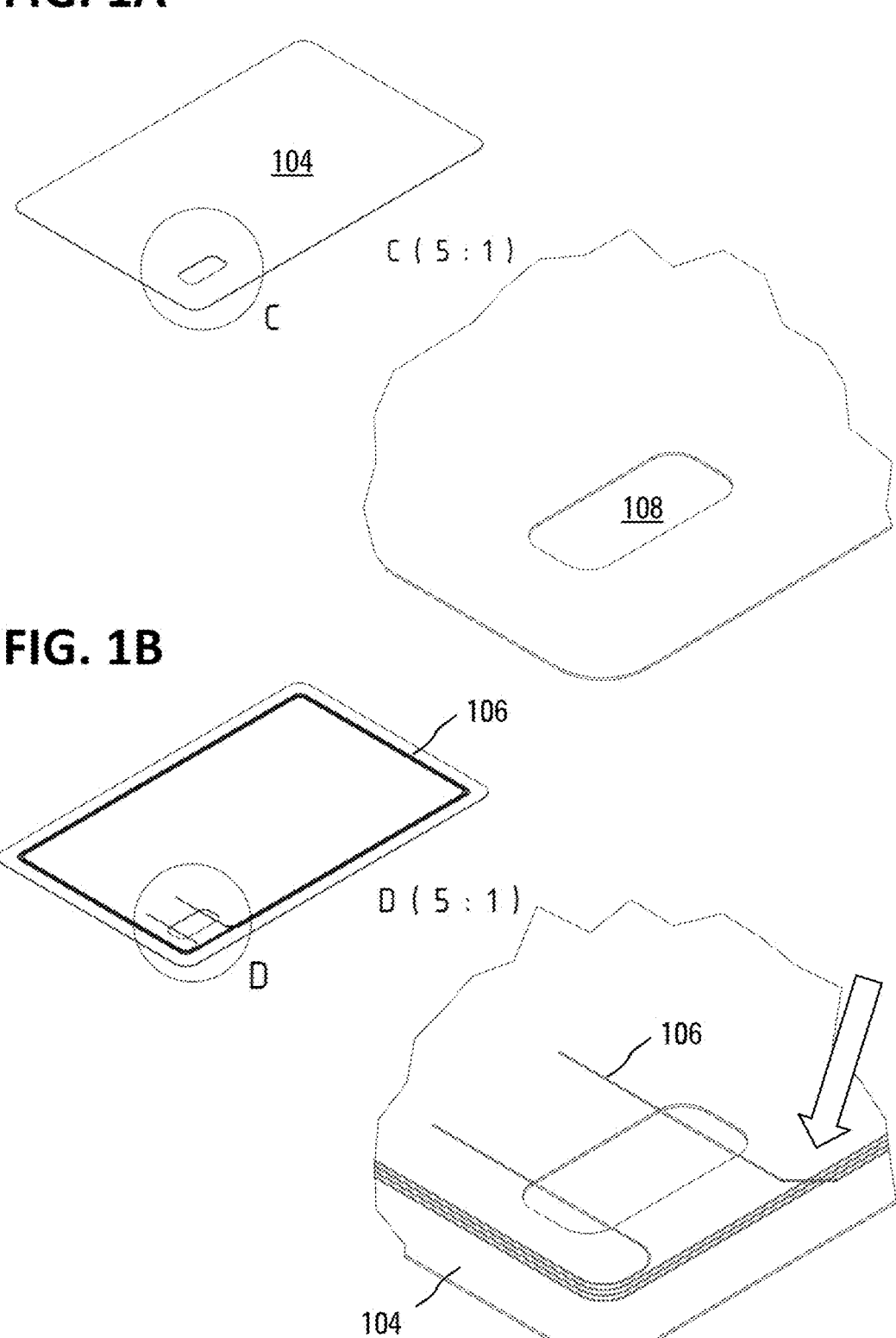
FIGS. 1A to 1D show an illustration of a method for producing a smart card inlay in accordance with various exemplary aspects.

In the following detailed description, reference is made to the accompanying drawings, which form part of this description and show, for illustration purposes, specific aspects in which the invention can be implemented. In this regard, direction terminology such as, for instance, "at the top", "at the bottom", "at the front", "at the back", "front", "rear", etc. is used with respect to the orientation of the figure(s) described. Since components of aspects can be positioned in a number of different orientations, the direction terminology serves for illustration and is not restrictive in any way whatsoever. It goes without saying that other aspects can be used and structural or logical changes can be made, without departing from the scope of protection of the present invention. It goes without saying that the features of the various exemplary aspects described herein can be combined with one another, unless specifically indicated otherwise. Therefore, the following detailed description should not be interpreted in a restrictive sense, and the scope of protection of the present invention is defined by the appended claims.

In the context of this description, the terms "connected", "attached" and "coupled" are used to describe both a direct and an indirect connection, a direct or indirect attachment, and a direct or indirect coupling. In the figures, identical or similar elements are provided with identical reference signs, insofar as this is expedient.

A smart card inlay is produced in a plurality of process steps.

FIGS. 1A to 1D illustrate a method for producing a smart card inlay 100 in accordance with various exemplary aspects. Each of FIGS. 1A to 1D shows a schematic perspective illustration of the smart card inlay 100 (in FIG. 1D) or of parts thereof (in FIGS. 1A to 1C), in each case with a partial enlargement.

The method for producing the smart card inlay 100 can comprise providing a carrier 104 having an opening 108. That is illustrated by way of example in FIG. 1A.

The carrier 104 can be for example similar or identical to a carrier known from the prior art for a smart card inlay having a laid antenna. The carrier 104 can for example comprise or be formed from a polymer, for example PVC, polycarbonate (PC), PET-G.

The carrier 104 can have a thickness Dr in a range of approximately 140 μm to approximately 160 μm, for example approximately 150 μm.

The opening 108 can be a through opening and can be dimensioned and positioned suitably for receiving a smart card module.

The opening 108 can be, or have been, stamped into the carrier 104, for example.

The method for producing the smart card inlay 100 comprises introducing an antenna wire 106 (for short: wire) into a surface of the carrier 104. That is illustrated by way of example in FIG. 1B.

The antenna wire comprises metal having an insulating coating. During laying, typically by means of an ultrasonic sonotrode method, typically approximately 75% of the cross section of the antenna wire 106 is embedded.

In various exemplary aspects, a copper antenna wire 106 having a diameter of approximately 80 μm to approximately 120 μm is used, comprising a thin coating of insulating varnish.

This varnish is provided in order to enable a crossover of the antenna wire 106 that is necessary as governed by the design for the laid antenna wire 106 (see e.g. the point marked by the arrow in the partial enlargement in FIG. 1B) without a short circuit. Other kinds of antenna laying wires provided with an insulating coating can be used as necessary.

The antenna wire 106 is laid in such a way that both ends of the antenna span the previously produced opening 108. That is discernible in the exemplary illustration in FIG. 1B, in particular in the partial enlargement.

After the antenna wire 106 has been laid, the insulating varnish is still situated on the wire, and so a soldering process is not possible in this state.

Figure 6:
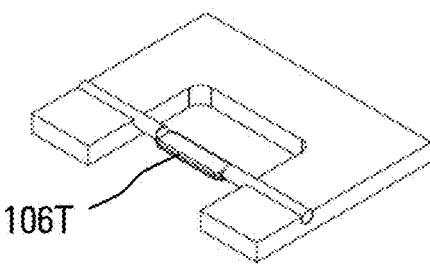
FIG. 6 shows an illustration of various designs of the pinched partial regions of metal of the antenna wire in accordance with various exemplary aspects.
Figure 6:
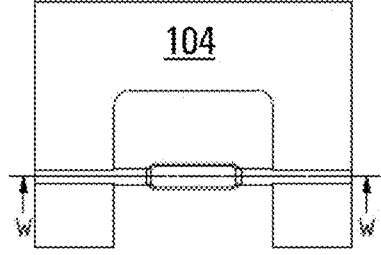
Figure 6:
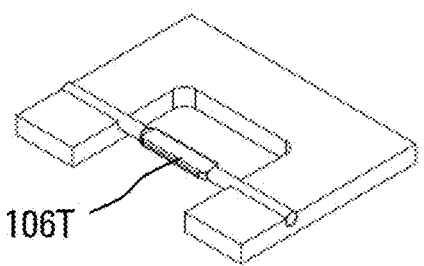
Figure 6:
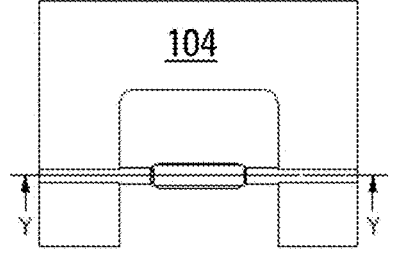
Figure 6:
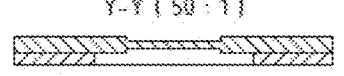
Figure 6:
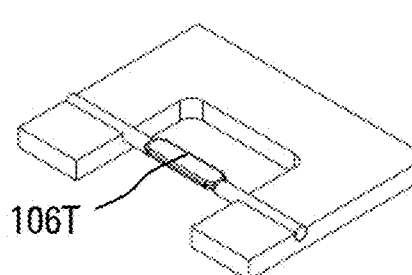
Figure 6:
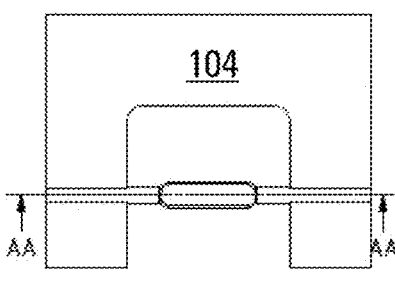
Figure 6:
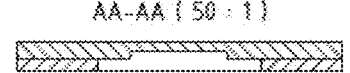
Figure 6:
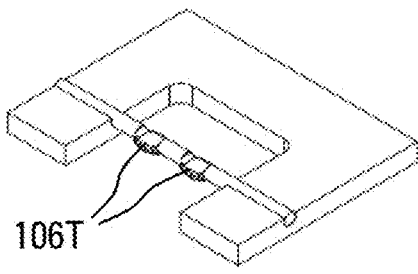
Figure 6:
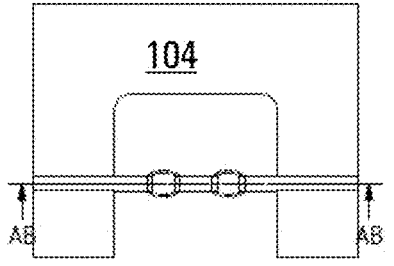
Figure 6:
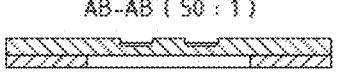

The method furthermore comprises, after laying, pinching the antenna wire 106, such that a partial region 106T of the metal of the antenna wire 106 is stripped of insulation. To put it another way, the pinching results in the removal of the insulating coating in the partial region 106T (or typically in at least two partial regions 106T, namely one near each end of the antenna, wherein in various exemplary aspects the one partial region 106T per end of the antenna can additionally be divided into a plurality of partial regions; in this respect, see FIG. 6, example 4)). A result of the pinching is illustrated by way of example in FIG. 1C. Additional exemplary aspects are shown in FIG. 6.

The exemplary figures illustrate the pinched partial regions 106T with smooth surfaces. In various exemplary aspects, one or both metal surfaces produced by means of the pinching can be roughened or provided with a structuring, whereby the rupturing of the insulating layer can be additionally promoted and an adhesive strength vis-à-vis the solder to be applied can be increased.

The partial region 106T can be arranged in the opening 108, and the pinching can be effected in the opening 108.

In various exemplary aspects, the pinching can be effected by means of a pinching device 550, for example an embossing tool. The pinching device 550 can be in two parts. In the case of an embossing tool, the two parts are usually referred to as embossing die and embossing plate, but generally what matters for the pinching operation in general is that the partial region 106T is arrangeable between the two parts 550A, 550B of the pinching device 550 and a force is able to be applied in a vertical direction (i.e. perpendicular to the antenna plane). Whether in this case one of the two parts 550A, 550B of the pinching device 550 (and which of them) is held in stationary fashion and the other part is moved, or whether both parts 550A, 550B are moved can be chosen depending on the desired positioning of the pinched partial region 106T. A relative size of the two parts 550A, 550B is likewise able to be chosen depending on the desired result, as long as at least one of the parts 550A, 550B has a pinching area which is small enough to be movable into the opening 108.

The partial region(s) 106T can be embossed during pinching. In the partial region(s) 106T, for example, proceeding from the original wire diameter, the wire can be flattened and widened. That is illustrated by way of example in FIG. 6.

In regard to the antenna wire 106 (or the metal of the antenna wire 106—since the insulating layer is typically a varnish, it makes at most an insignificant contribution to the diameter of the antenna wire), a thickness of the partial region 106T can be reduced to approximately 30% to approximately 60% of its original diameter.

During the pinching operation (e.g. the embossing process), the insulating varnish ruptures, such that the metal (e.g. copper) of the antenna wire 106 is at least partly exposed and is usable for a soldering process.

In various exemplary aspects, the exposure of the copper can be supported by a defined surface of the embossing tool (roughness depth, profile) and/or by additional measures (ultrasound during embossing, subsequent flame treatment/ablation of the insulating varnish).

The embossing die (e.g. the part 550A of the pinching device 550) can have radii at the edges of the functional area in order to obtain a smooth transition from the partial region 106T to be pinched/embossed to the normal wire diameter. Furthermore, the embossing die can have a defined surface (roughness, profile), for example a sawtooth-like profile, peaks, cavities, etc., for example with a roughness in a range of Rz=0.1 μm (polished) to Rz=10 μm.

Figure 5:
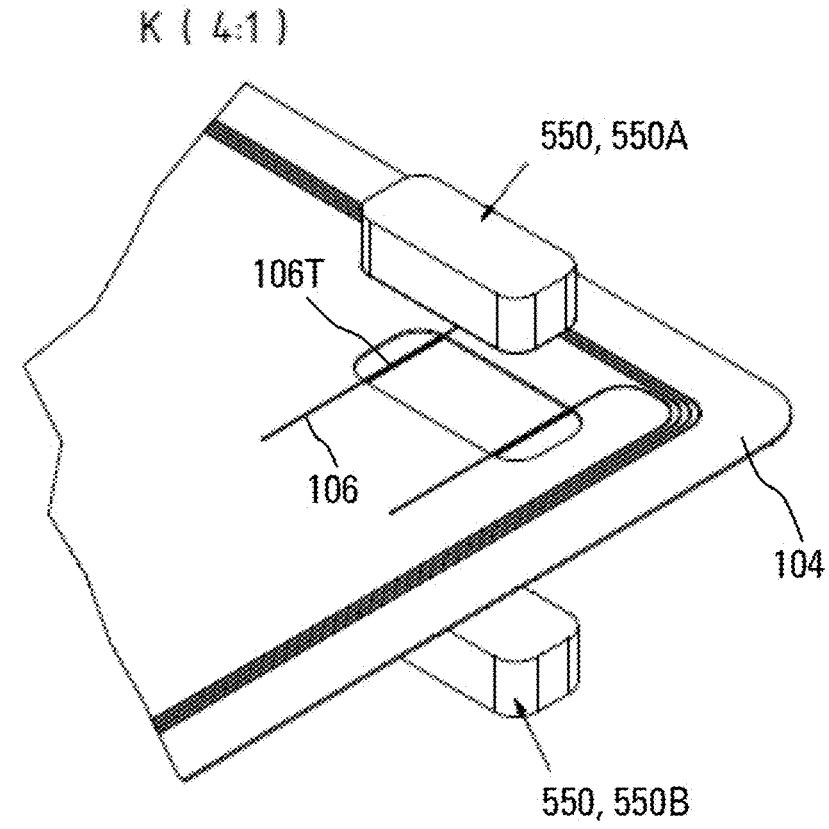
FIG. 5 shows an illustration of a pinching operation in the method for producing a smart card inlay in accordance with various exemplary aspects.
Figure 5:
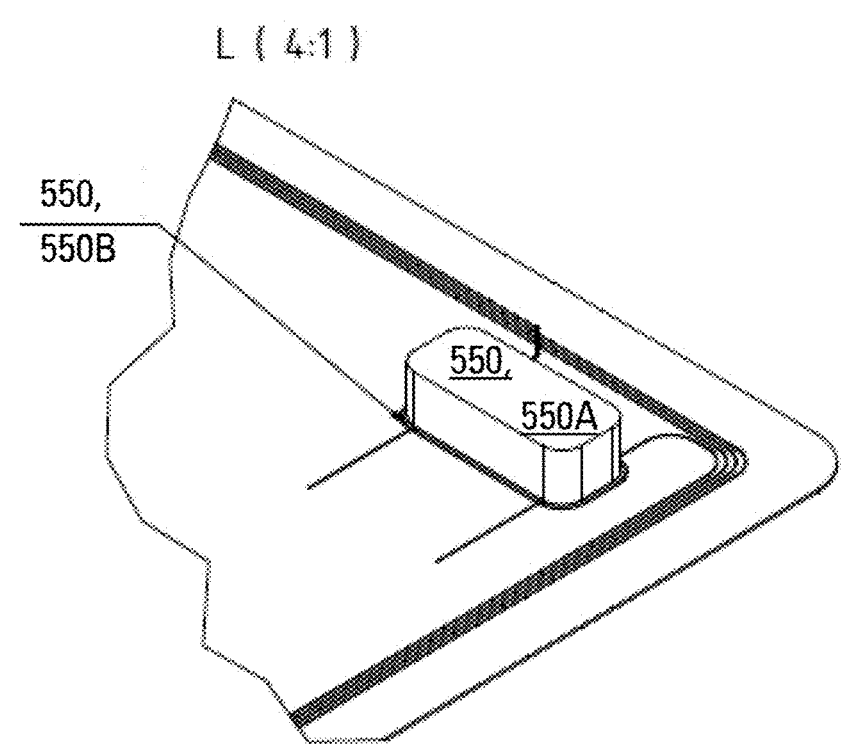

The size of the embossing region can be oriented to the desired soldering region. In the exemplary aspect from FIG. 5, the embossing plate (the part 550B of the pinching device 550) is larger than the embossing die (the part 550A of the pinching device 550). By way of example, a single embossing region (the pinched partial region 106T) or a plurality of small embossing regions can be provided per antenna wire 106 (or per end).

Figure 1C:
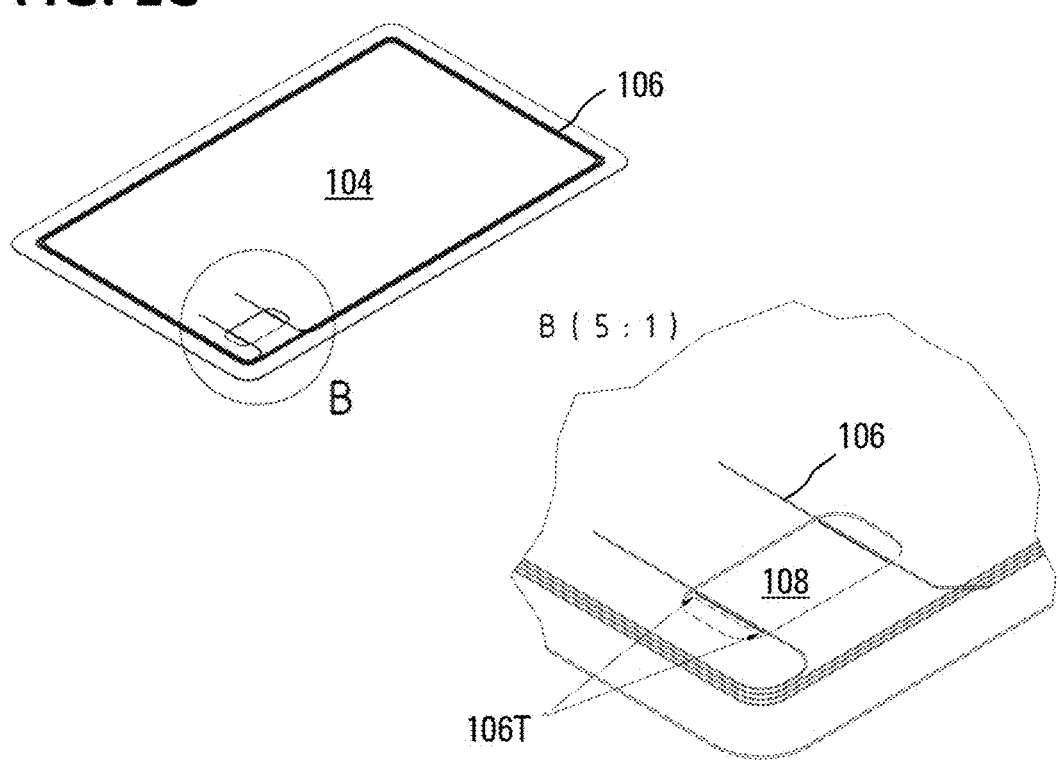
Figure 1D:
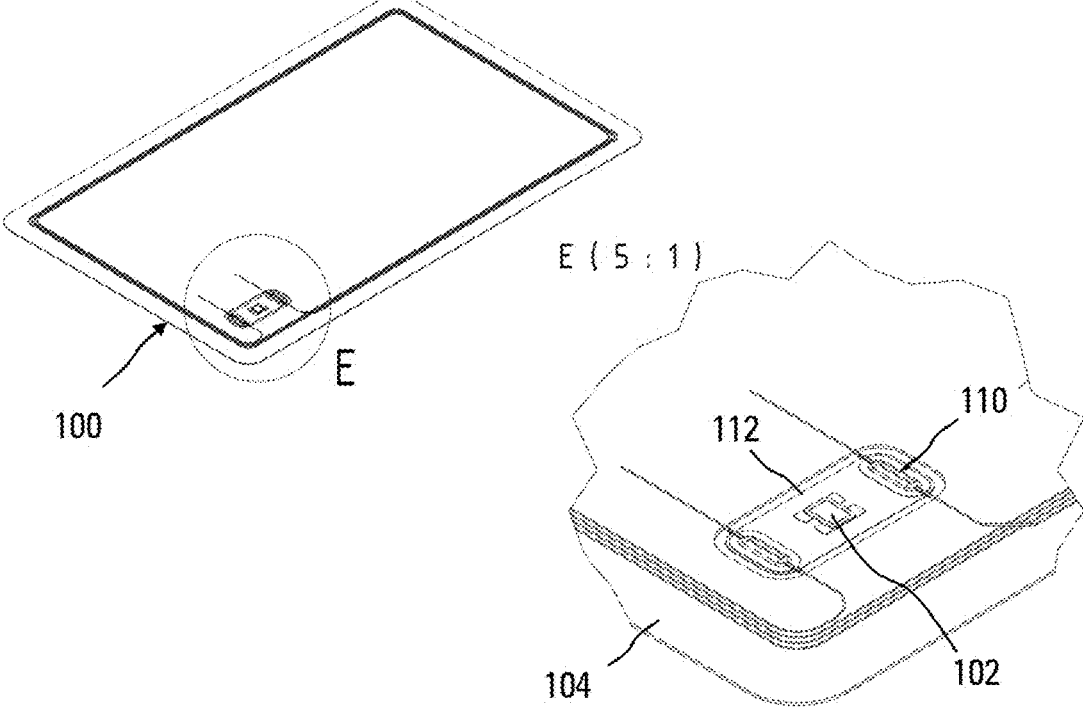
Figure 2:
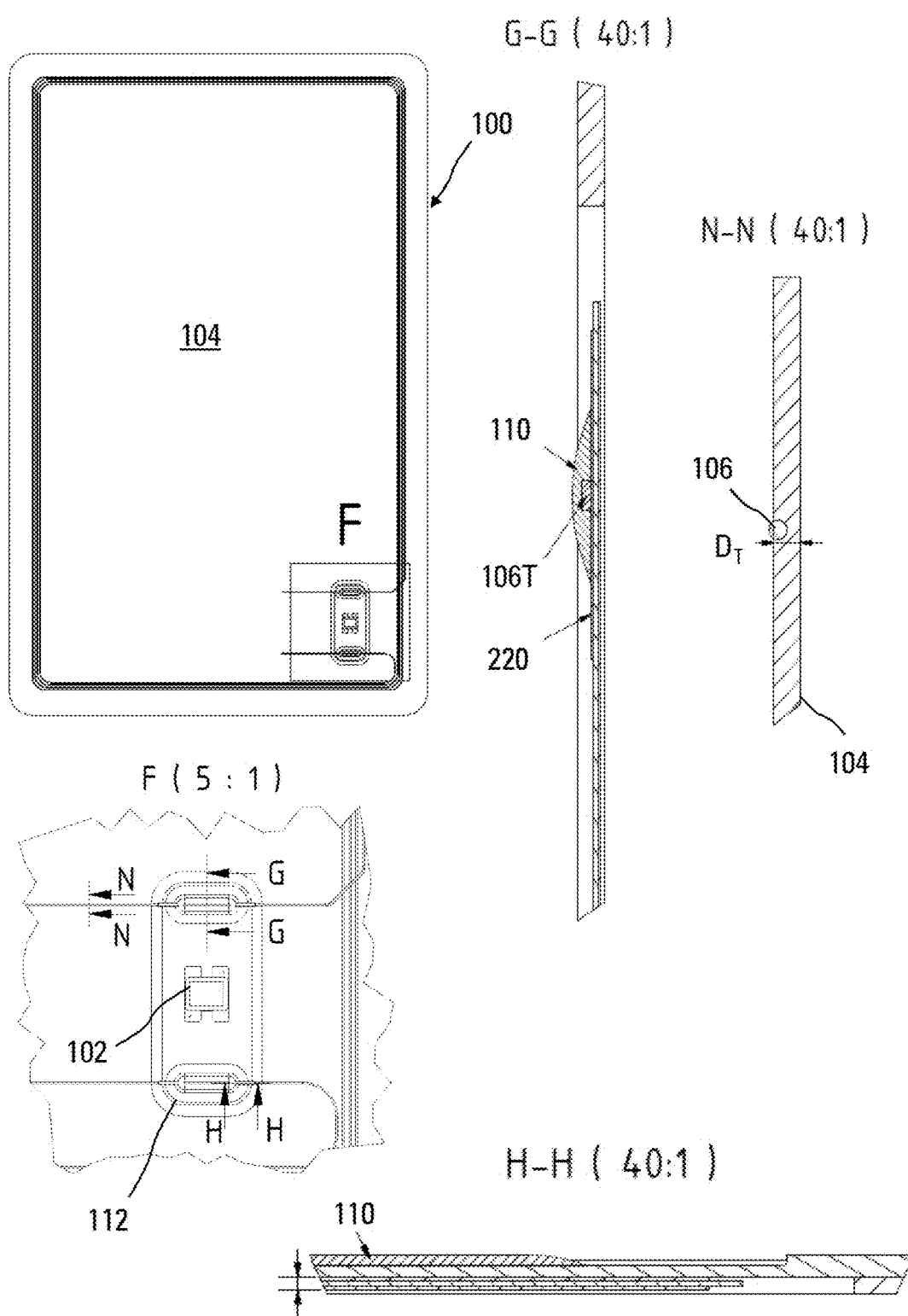
FIG. 2 shows various schematic views of a smart card inlay in accordance with various exemplary aspects.

In the exemplary aspect from FIGS. 1C and 1D and FIG. 2, the pinching was performed in such a way that a surface of the antenna wire 106 facing away from the carrier 104, overall, including in the pinched partial region 106T, still lies substantially in one plane. That is also the case in the exemplary aspects from FIG. 6.

Figures 3A, 3B:
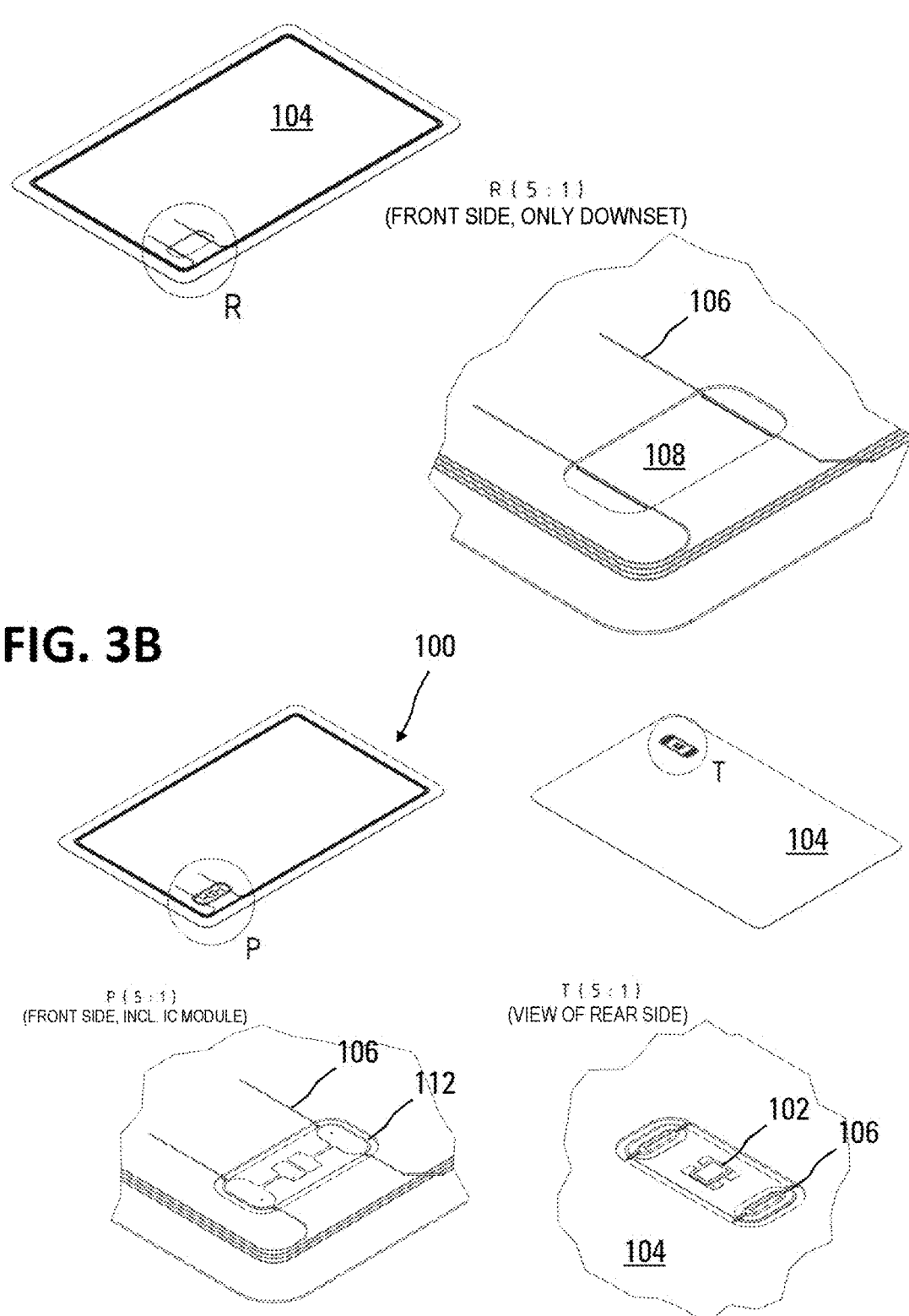
FIGS. 3A and 3B show alternatives in accordance with various exemplary aspects to the processes illustrated in FIGS. 1C and 1D in the method for producing a smart card inlay in accordance with various exemplary aspects.
Figure 4:
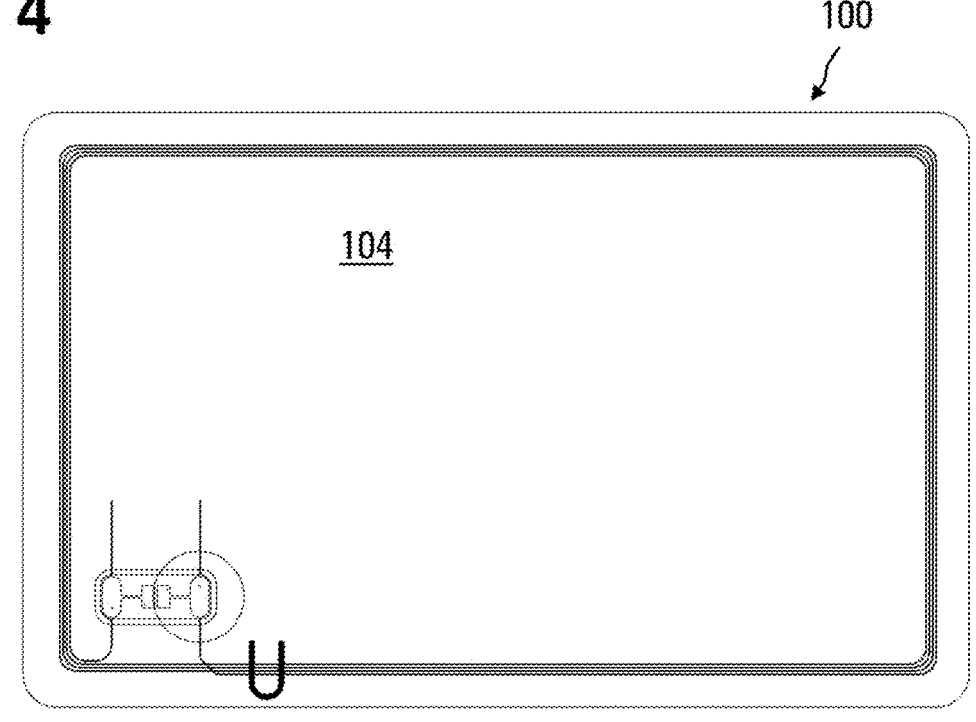
FIG. 4 shows various schematic views of a smart card inlay in accordance with various exemplary aspects.
Figure 4:
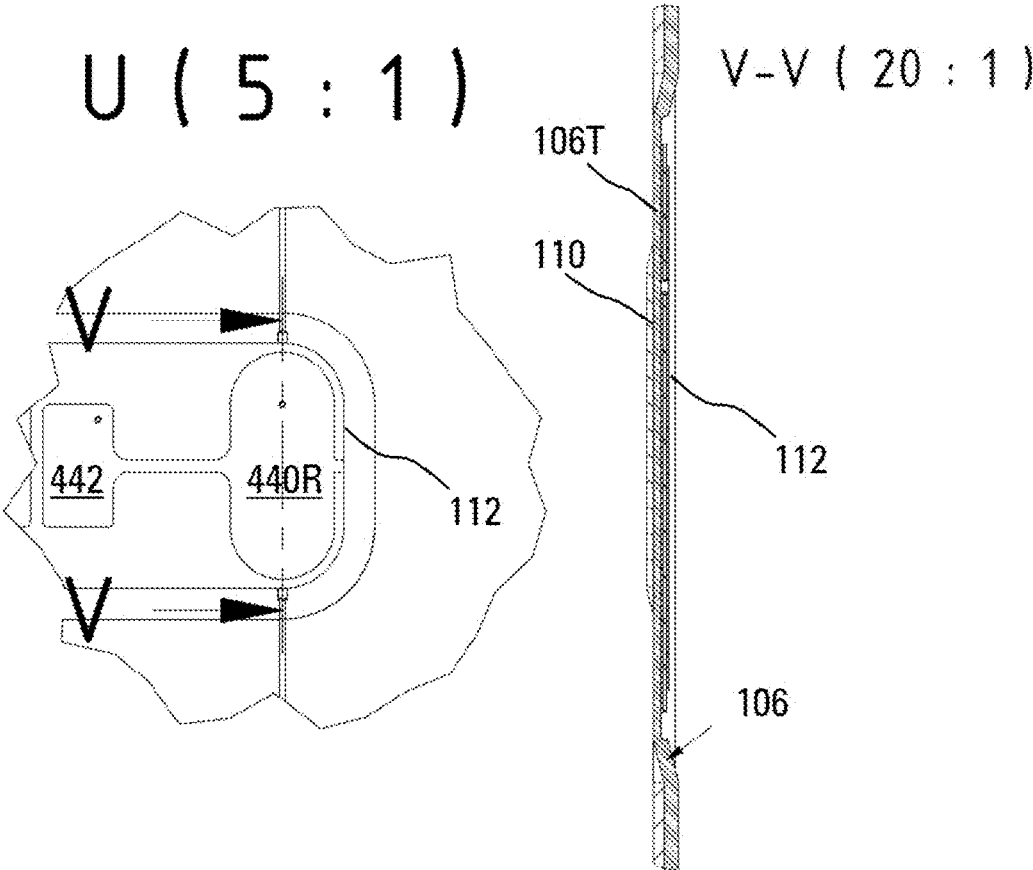

In the exemplary aspect from FIGS. 3A and 3B and FIG. 4, during pinching the partial region 106T of the antenna wire 106 was additionally offset vertically, namely from the antenna side of the smart card inlay 100 (which is also referred to as the front side) in the direction of the opposite side of the smart card inlay 100 (which is also referred to as the rear side). This operation is also referred to as "downset".

In various exemplary aspects, the method furthermore comprises soldering the insulation-stripped partial region 106T of the metal of the antenna wire 106 with a metallic contact region 440 of a smart card module 112 that has been introduced into the opening 108 of the carrier 104.

The contact region 440 can comprise two contact region areas 440, one for each end of the antenna wire 106.

The contact region 440 can be connected to a rear-side contact 440R in each case by a via 770.

Figure 7:
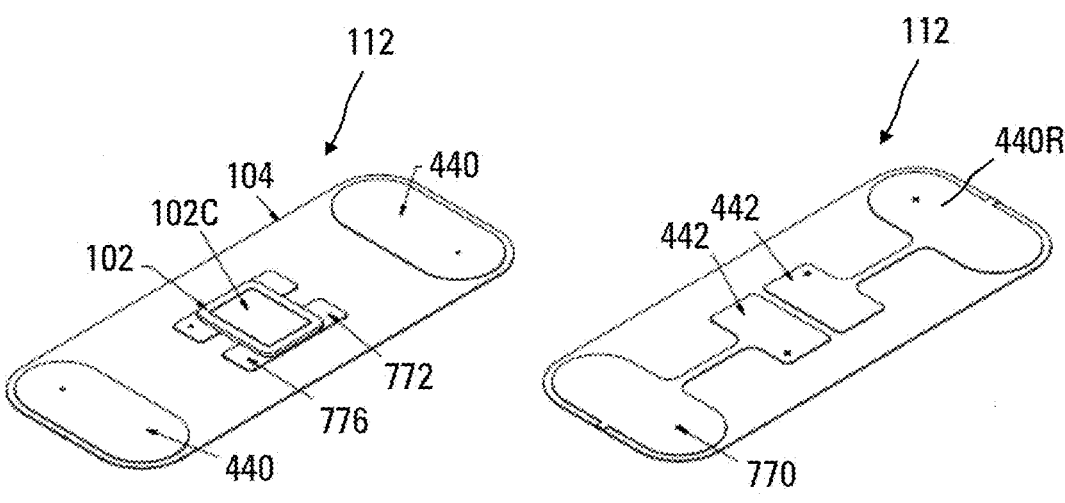
FIG. 7 shows illustrations of the smart card module in accordance with various exemplary aspects.
Figure 7:
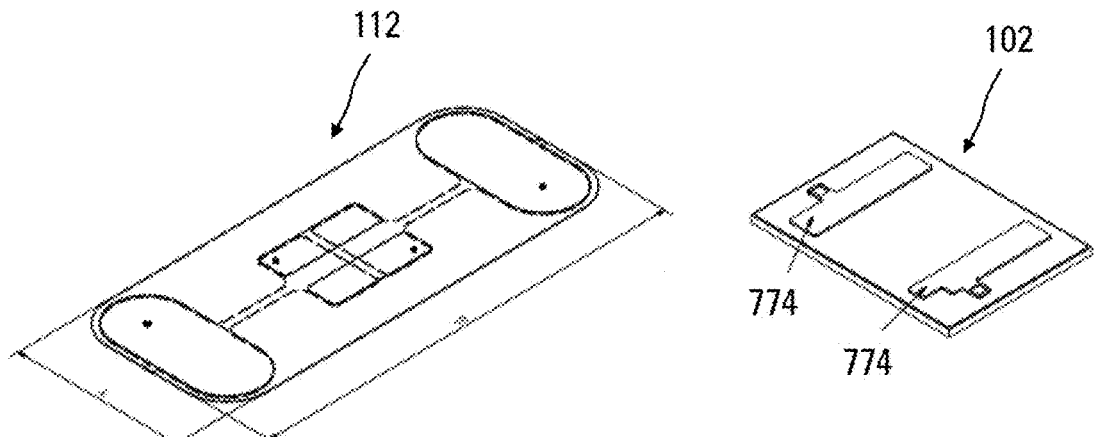

The soldering operation is illustrated in FIGS. 1D and 3B, and FIG. 7 shows exemplary details of the smart card module 112.

The thin smart card module 112 can comprise a thin polyimide substrate with metallization on two sides and through contacts 770 (PTH).

The chip side can be embodied in such a way that the chip 102 is mounted as a flip-chip in a (e.g. central) region, wherein LA/LB contacts 774 of the flip-chip 102 make contact with respective contact pads 776 (also referred to as land pads) for the chip 102.

An electrically conductive connection between the contact pads 776 and the (e.g. outer) metallic contact regions 440 (the LA/LB terminals) takes place with the aid of through contacts 772 connecting the contact pads 776 to metal reinforcing areas on the rear side of the smart card module 112, and through contacts 770 connecting a front side and a rear side of the contact regions 440, such that the module region on the chip side between the (inner) contact pads 442 and the (outer) contact regions 440 remains free of metal.

This is advantageous for the later soldering mounting since this makes it possible to prevent any solder 110 from flowing in the direction of the flip-chip 102.

A total thickness of the smart card module 112 typically amounts to between approximately 100 μm and approximately 150 μm (e.g. approximately 120 μm). A smart card module 112 that is as small (in particular short) as possible is desirable in order to minimize the material flaw produced by the opening 108 in the construction of the card.

In various exemplary aspects, the smart card module 112 is guided into the opening 108 with the chip side facing the wire, and the metallic contact regions 440 (which correspond e.g. to terminals LA/LB as known from the prior art) are soldered onto the pinched partial regions 106T of the antenna wire 106. For the sake of simplicity, front and rear sides of the metallic contact regions 440, which are connected through a smart card module substrate by means of a via 770, are provided with the same reference sign in the figures.

By virtue of this arrangement, the chip 102 lies in the cavity, that is to say that, on the one hand, the chip is protected and, on the other hand, the thinnest possible construction is made possible in this way.

In the case where the pinched partial region 106T of the antenna wire 106 runs over the opening 108 on the antenna side (the front side), the smart card module 112 is accordingly introduced into the opening 108 in such a way that the chip side of the smart card module 112 and the antenna side of the carrier 104 face in the same direction.

In the case (in the case of "downset") where the pinched partial region 106T of the antenna wire 106 runs over the opening 108 on the opposite side (the rear side) with respect to the antenna side, the smart card module 112 is accordingly introduced into the opening 108 in such a way that the chip side of the smart card module 112 and the rear side of the carrier 104 face in the same direction.

Figures 8, 9:
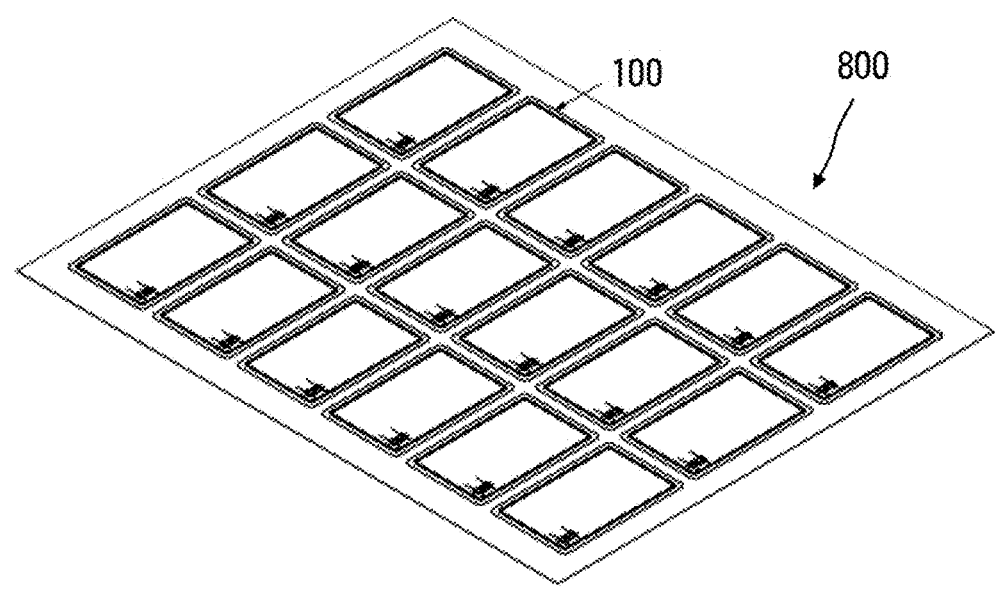
FIG. 8 shows a matrix arrangement of a plurality of smart card inlays in accordance with various exemplary aspects during production of the smart card inlay.
FIG. 9 shows a schematic cross-sectional view of a smart card in accordance with various exemplary aspects.

FIG. 8 shows a matrix arrangement 800 of a plurality of smart card inlays 100 in accordance with various exemplary aspects during production of the smart card inlay 100, which illustrates that the method for producing the smart card inlay 100 enables joint production and subsequent singulation of the smart card inlays 100.

FIG. 9 shows a schematic cross-sectional view of a smart card 900 in accordance with various exemplary aspects.

The smart card 900 comprises a smart card body 990, 992 (e.g. as top side and underside), and a smart card inlay 100 in accordance with various exemplary aspects.

The smart card inlay 100 can be embedded, for example laminated, into the smart card body 990, 992.

The production of the smart card 900 using the smart card inlay 100 can take place in a manner substantially as known from the prior art, although additional protective measures that are customary in accordance with the prior art for protecting the smart card body 990, 992 against breaking can be dispensed with.

It goes without saying that the smart card 900 does not just relate to a smart card in the ID1 format but rather can generally concern thin/planar chip devices such as e.g. pages of an identification document (e.g. passport) or the like.

Accordingly, aside from the customary materials in smart card production such as polymers (e.g. polycarbonate), the smart card body 990, 992 can comprise paper or other suitable materials, for example.

FIG. 10 shows a flow diagram 1000 of a method for producing a smart card inlay.

The method comprises introducing an antenna wire into a surface of a carrier, wherein the antenna wire comprises metal, comprising an insulating coating. The method furthermore comprises pinching the antenna wire, such that a partial region of the metal of the antenna wire is stripped of insulation, and soldering the insulation-stripped partial region of the metal of the antenna wire with a metallic contact region of a smart card module that has been introduced into an opening of the carrier.

Some exemplary aspects are indicated in summary below.

Exemplary aspect 1 is a method for producing a smart card inlay. The method comprises introducing an antenna wire into a surface of a carrier, wherein the antenna wire comprises metal, comprising an insulating coating, for example a varnish. The method furthermore comprises pinching the antenna wire, such that a partial region of the metal of the antenna wire is stripped of insulation, and soldering the insulation-stripped partial region of the metal of the antenna wire with a metallic contact region of a smart card module that has been introduced into an opening of the carrier.

Exemplary aspect 2 is a method in accordance with exemplary aspect 1 which furthermore comprises cleaning the insulation-stripped partial region of the metal before soldering.

Exemplary aspect 3 is a method in accordance with exemplary aspect 1 or 2, wherein during pinching the thickness of the insulation-stripped partial region of the metal of the antenna wire is reduced.

Exemplary aspect 4 is a method in accordance with any of exemplary aspects 1 to 3, wherein during pinching a plurality of partial regions of the metal of the antenna wire are stripped of insulation.

Exemplary aspect 5 is a method in accordance with any of exemplary aspects 1 to 4, wherein the opening is a through opening.

Exemplary aspect 6 is a method in accordance with any of exemplary aspects 1 to 5 which furthermore comprises introducing the smart card module into the opening.

Exemplary aspect 7 is a method in accordance with exemplary aspect 6, wherein the smart card module is introduced into the opening from an opposite side of the carrier with respect to the antenna side.

Exemplary aspect 8 is a method in accordance with any of exemplary aspects 1 to 6, wherein the partial region is offset vertically during the pinching of the wire.

Exemplary aspect 9 is a method in accordance with exemplary aspect 8, wherein the smart card module is introduced into the opening from the antenna side of the carrier.

Exemplary aspect 10 is a method in accordance with any of exemplary aspects 1 to 9, wherein the insulation-stripped partial region of the metal that is to be soldered is structured or roughened during pinching.

Exemplary aspect 11 is a method in accordance with any of exemplary aspects 1 to 10, wherein in the pinched partial region a thickness of the antenna wire amounts to 30%-60% of the thickness of the antenna wire in the non-pinched regions.

Exemplary aspect 12 is a method in accordance with any of exemplary aspects 1 to 11, wherein inside the opening the antenna wire runs on the same side of the smart card inlay as outside the opening.

Exemplary aspect 13 is a method in accordance with any of exemplary aspects 1 to 11, wherein inside the opening the antenna wire runs on an opposite side of the smart card inlay with respect to the side of the smart card inlay on which the antenna wire is arranged.

Exemplary aspect 14 is a method in accordance with any of exemplary aspects 1 to 13, wherein a thickness of the smart card inlay is less than 180 µm.

Exemplary aspect 15 is a smart card inlay. The smart card inlay comprises a carrier having an opening, an antenna wire arranged in a surface of the carrier, wherein the antenna wire comprises metal, comprising an insulating coating, and wherein a partial region of the metal of the antenna wire is stripped of insulation by means of pinching, and a smart card module having a metallic contact region, wherein the smart card module is arranged in the opening of the carrier, wherein the insulation-stripped partial region of the metal of the antenna wire is soldered with the metallic contact region of the smart card module.

Exemplary aspect 16 is a smart card inlay in accordance with exemplary aspect 15, wherein in the pinched partial region a thickness of the antenna wire amounts to 30%-60% of the thickness of the antenna wire in the non-pinched regions.

Exemplary aspect 17 is a smart card inlay in accordance with exemplary aspect 15 or 16, wherein the opening is a through opening.

Exemplary aspect 18 is a smart card inlay in accordance with exemplary aspects 15 to 17, wherein inside the opening the antenna wire runs on the same side of the smart card inlay as outside the opening.

Exemplary aspect 19 is a smart card inlay in accordance with exemplary aspects 15 to 17, wherein inside the opening the antenna wire runs on an opposite side of the smart card inlay with respect to the side of the smart card inlay on which the antenna wire is arranged.

Exemplary aspect 20 is a smart card inlay in accordance with exemplary aspects 15 to 19, wherein a thickness of the smart card inlay is less than 180 µm.

Exemplary aspect 21 is a smart card inlay in accordance with exemplary aspects 15 to 20, wherein the insulation-stripped partial region of the metal was free of residues and contaminations before soldering.

Exemplary aspect 22 is a smart card inlay in accordance with exemplary aspects 15 to 21, wherein the thickness of the insulation-stripped pinched partial region of the metal is smaller than the thickness of the rest of the antenna wire.

Exemplary aspect 23 is a smart card inlay in accordance with any of exemplary aspects 15 to 22, wherein the partial region comprises a plurality of insulation-stripped partial regions of the metal of the antenna wire that are separated from one another.

Exemplary aspect 24 is a smart card inlay in accordance with any of exemplary aspects 15 to 23, wherein the smart card module is introduced into the opening from an opposite side of the carrier with respect to the antenna side.

Exemplary aspect 25 is a smart card inlay in accordance with any of exemplary aspects 15 to 24, wherein the partial region of the wire is offset vertically relative to an original position after laying.

Exemplary aspect 26 is a smart card inlay in accordance with exemplary aspect 25, wherein the smart card module is introduced into the opening from the antenna side of the carrier.

Exemplary aspect 27 is a smart card inlay in accordance with any of exemplary aspects 15 to 26, wherein the insulation-stripped partial region of the metal that is to be soldered has a roughened or structured surface.

Exemplary aspect 28 is a smart card. The smart card comprises a smart card inlay in accordance with any of exemplary aspects 15 to 27 and a smart card body, wherein the smart card inlay is embedded in the smart card body.

Further advantageous configurations of the device are evident from the description of the method, and vice versa.

The invention claimed is:

1. A method for producing a smart card inlay, the method comprising:
   introducing an antenna wire into a surface of a carrier having an opening, wherein the antenna wire comprises metal having an insulation coating, and wherein the antenna wire spans the opening;
   pinching the antenna wire in the opening such that a partial region of the metal of the antenna wire is stripped of the insulation coating; and
   soldering the insulation coating-stripped partial region of the metal of the antenna wire with a metallic contact region of a smart card module that has been introduced into the opening of the carrier.

2. The method as claimed in claim 1, furthermore comprising:
   cleaning the insulation coating-stripped partial region of the metal before soldering.

3. The method as claimed in claim 1,
   wherein during pinching a thickness of the insulation coating-stripped partial region of the metal of the antenna wire is reduced.

4. The method as claimed in claim 1,
   wherein during pinching a plurality of partial regions of the metal of the antenna wire are stripped of the insulation coating.

5. The method as claimed in claim 1,
   wherein the opening is a through opening.

6. The method as claimed in claim 1, further comprising:
   introducing the smart card module into the opening.

7. The method as claimed in claim 6,
   wherein the smart card module is introduced into the opening from an opposite side of the carrier with respect to an antenna side.

8. The method as claimed in claim 1,
   wherein the partial region is offset vertically during the pinching of the wire.

9. The method as claimed in claim 8, wherein the smart card module is introduced into the opening from an antenna side of the carrier.

10. The method as claimed in claim 8, wherein the insulation-stripped partial region of the metal that is to be soldered is structured or roughened during pinching.

11. The method as claimed in claim 1, wherein during pinching a thickness of the insulation coating-stripped partial region of the metal of the antenna wire is reduced to 30%-60% of a thickness of the antenna wire in non-pinched regions.

12. The method as claimed in claim 1, wherein both ends of the antenna wire span the opening.

13. A smart card inlay, comprising:

a carrier having an opening;

an antenna wire arranged in a surface of the carrier, wherein the antenna wire comprises metal having an insulating coating, wherein the antenna wire spans the opening, and wherein a partial region of the metal of the antenna wire in the opening is stripped of insulation by means of pinching; and a smart card module having a metallic contact region, wherein the smart card module is arranged in the opening of the carrier, and wherein the insulation-stripped partial region of the metal of the antenna wire is soldered with the metallic contact region of the smart card module.

14. The smart card inlay as claimed in claim 13, wherein in the pinched partial region, a thickness of the antenna wire amounts to 30%-60% of the thickness of the antenna wire in non-pinched regions.

15. The smart card inlay as claimed in claim 13, wherein the opening is a through opening.

16. The smart card inlay as claimed in claim 13, wherein inside the opening the antenna wire runs on the same side of the smart card inlay as outside the opening.

17. The smart card inlay as claimed in claim 13, wherein inside the opening the antenna wire runs on an opposite side of the smart card inlay with respect to the side of the smart card inlay on which the antenna wire is arranged.

18. The smart card inlay as claimed in claim 13, wherein a thickness of the smart card inlay is less than 180 μm.

19. A smart card, comprising:

a smart card inlay as claimed in claim 13; and a smart card body, wherein the smart card inlay is embedded in the smart card body.

20. The smart card inlay as claimed in claim 13, wherein both ends of the antenna wire span the opening.

* * * * *